May 5, 1925.
M. F. JUDD
1,536,588
CLUTCH
Filed Nov. 27, 1922
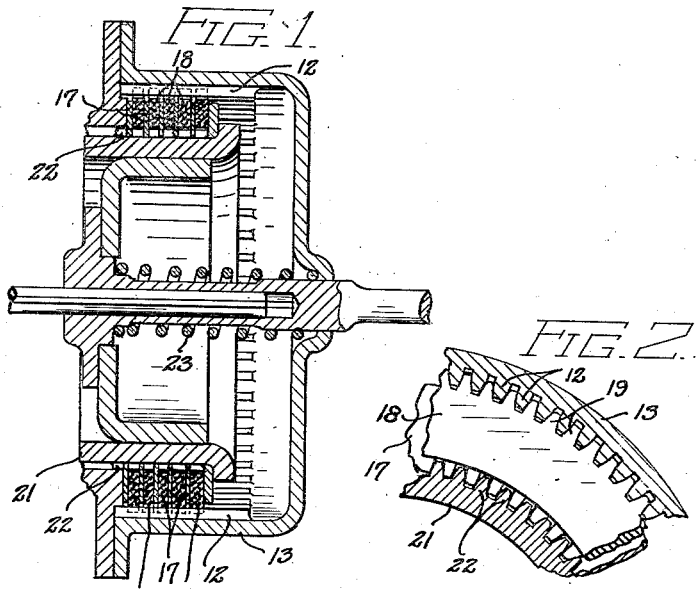
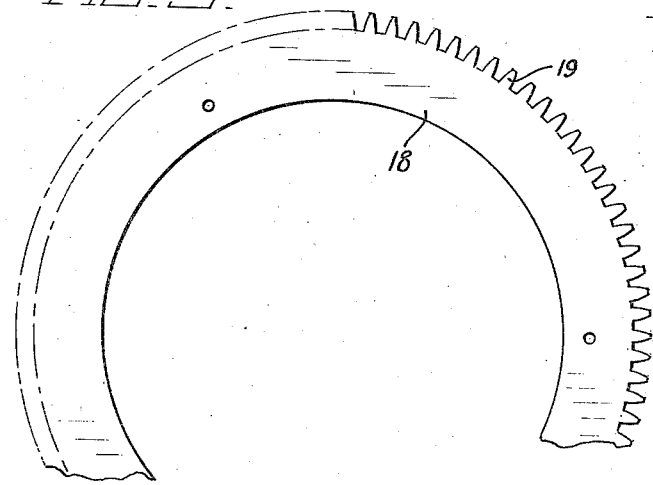
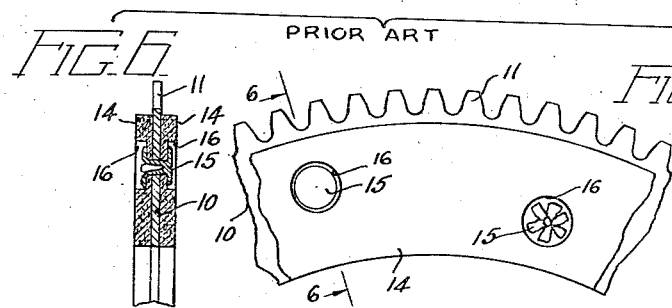
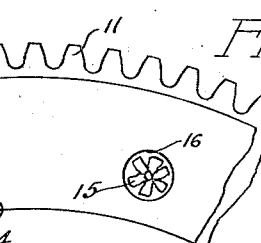
INVENTOR
Morton F. Judd
BY
Wooster & Davis
ATTORNEYS.

Patented May 5, 1925.

1,536,588

UNITED STATES PATENT OFFICE.

MORTON F. JUDD, OF STRATFORD, CONNECTICUT, ASSIGNOR TO THE RAYBESTOS COMPANY, OF BRIDGEPORT, CONNECTICUT, A CORPORATION OF CONNECTICUT.

CLUTCH.

Application filed November 27, 1922. Serial No. 603,560.

*To all whom it may concern:*

Be it known that I, MORTON F. JUDD, a citizen of the United States, residing at Stratford, county of Fairfield, State of Connecticut, have invented an Improvement in Clutches, of which the following is a specification.

This invention relates to plates for multiple disk clutches especially such as are used in automobile transmissions, and has for an object to provide an improved plate which will operate smoothly and noiselessly, which will wear longer than the plates now generally used, which will be of less thickness than those now generally employed so that more plates may be used in a clutch of given dimensions, and, therefore, increase the power which may be transmitted by the clutch, and also to produce a plate which may be manufactured at less cost.

With the foregoing and other objects in view, I have devised the construction illustrated in the accompanying drawing, in which—

Fig. 1 is a central longitudinal section through a conventional form of multiple disk clutch, the means for sliding the plates, however, not being shown, as it may be any of the usual means now generally employed.

Fig. 2 is a fragmentary section showing a portion of my improved disk, and one way by which it may be driven from the shells or drums, this figure being on a larger scale than Fig. 1.

Fig. 3 is a side elevation of my improved disk or plate.

Fig. 4 is an edge view thereof.

Fig. 5 is a side view of a section of a disk or plate showing the construction now generally employed, and Fig. 6 is a section substantially on line 6—6 of Fig. 5.

In multiple disk clutches, as at first employed, a series of alternatively driving and driven steel plates was employed which of course ran in a bath of oil to insure smooth engagement of the plates and to prevent roughening of the plates under friction. With the use of the oil bath, however, it was found that it usually required some means of separating the plates upon declutching to overcome the adhesion of the plates after the oil had been driven from between them, as otherwise often a depression of the clutch pedal only resulted in the removing of the spring pressure from the clutch, but did not disconnect the engine from the transmission as it is designed to do.

The next step in the development of multiple disk clutches was to omit the oil bath and provide one set of clutch plates with asbestos friction facings. A further advantage was thus gained in being able to run the clutch dry and on account of the higher coefficient of friction of the facings it was possible either to reduce the number of plates, or to reduce the spring pressure. On account of the extra space taken up by the facings the reduction in the number of plates has been generally followed in order not to increase the over-all dimensions of the clutch.

I have illustrated in Figs. 5 and 6, a disk or plate of this type in which 10 is a metal disk provided with teeth 11 throughout its periphery to engage the keys or splines 12 in the outer drum or shell 13 whereby the plate is secured to the drum or shell and they will rotate in unison. On opposite sides of this plate are the asbestos facings 14 comprising usually flat rings made under pressure from fibre which comprises principally asbestos fibre, and held together by a suitable binder. The facings are secured to the disk 10 by suitable rivets 15, the heads of which are located in countersinks 16 as shown, so that they will not contact with the adjacent metal plates indicated at 17 in Fig. 1. It will be apparent from an inspection of Figs. 5 and 6 that the addition of the friction facings greatly increases the thickness of the plate, and also that the securing of the facings to the plate requires the setting of a considerable number of rivets.

In carrying out my invention I make the entire disk of the fibre, principally asbestos secured together by a suitable binder, as shown at 18 in Figs. 3 and 4. This disk or plate will also have cut or formed integral therewith either in its inner or outer periphery, as desired, the teeth 19 for engaging the keys or splines 12 in the drum or shell through which these plates are to rotate; in the present instance the outer shell or drum 13. This decreases the cost of manufacture of the disk, as no fitting of facings to the disk is required or riveting operations to secure the facings to the disk. At the same time the thickness of disk required is considerably reduced, thus allowing the use of a greater number of disks in a clutch of a given length so that the power which may be transmitted by a given size of clutch may be increased, or the strength of the clutch spring may be reduced allowing easier declutching. As there are a large number of teeth 19 throughout the periphery of a disk, the power which must be transmitted by each tooth is small and the strength of these teeth is ample to carry the same. This form of disk also greatly reduces the number of parts required as it is made in one piece instead of the three pieces shown in Figs. 5 and 6, to say nothing of the considerable number of rivets 15 necessary to properly secure the facings 14 to the disk 10.

In the old form of clutch plate, after the clutch had been in use for some time or if care was not used in operating the same, the metal teeth 11 would form recesses or depressions in the sides of the keys or splines 12, which when the clutch spring was released would tend to hold the plates stationary and not allow them to have the required longitudinal movement to properly release them. With the form of disk, however, shown in Figs. 3 and 4, the teeth 19 are also composed of asbestos fibre which is relatively softer than the metal of the keys or splines 12 so that the liability of forming these grooves or recesses in these keys or splines is reduced by the use of this molded disk.

Referring to Figs. 1 and 2, the outer shell or drum carrying the keys or splines 12 is shown at 13 and the inner shell or drum is shown at 21, this inner shell or drum being provided on its outer periphery with keys or splines 22. These two drums are mounted for relative rotary and longitudinal movement in the usual manner, the inner shell being the one which is usually given longitudinal movement by operation of the clutch pedal to release the clutch. The clutch spring 23 moves the same in the opposite direction when the clutch pedal is released to press the alternate disks or plates 17 and 18 together to apply the clutch so that the two drums or shells will rotate in unison as is common and well known. As this construction and operation is ordinary and well known a further detailed description and illustration is believed to be unnecessary.

Throughout the specification and claims I have referred to the clutch plates or disks, and I intend this term to be generic and not to limit these elements to a solid disk, but to include various shapes such as the flat annular ring shaped discs of plates as shown.

Having thus set forth the nature of my invention, what I claim is:

1. In a power transmission device relatively rotatable driving and driven elements, a series of disks between said elements, means for connecting alternate disks to the two elements to rotate therewith including teeth on the disks, the disks of one set being composed principally of asbestos fibre held to shape by a suitable binder and with their teeth integral with the bodies of the disks, and means for bringing the disks into frictional engagement whereby one set will be driven by the other.

2. In a multiple disk clutch a pair of relatively rotatable drums one of which has a series of longitudinal keys on the inner surface thereof and the other a series of longitudinal keys on the outer surface thereof, a plurality of annular disks between said elements, alternate disks being provided with teeth or projections on their outer and inner peripheries respectively to engage said keys whereby the disks are connected to rotate with said drums, one set of disks being composed of compressed fibre held to shape by a suitable binder and with the teeth integral with the bodies of the disks, and means for bringing the disks into frictional engagement whereby one set will be driven by the other.

3. In a multiple disk clutch a pair of relatively rotatable drums one of which has spaced longitudinal keys throughout the inner periphery thereof and the other spaced longitudinal keys throughout the outer periphery thereof, a plurality of annular disks between said elements, alternate disks being provided with spaced teeth throughout their outer and inner peripheries respectively adapted to engage the said keys on the drums, whereby the alternate disks are connected to rotate with said drums, one set of disks being composed of compressed fibre held to form by a suitable binder and with the teeth integral with the bodies of the disks, and means for bringing the disks into frictional engagement whereby one set may be driven by the other.

4. In a multiple disk clutch a pair of relatively rotatable drums one of which has a series of longitudinal keys on the inner surface thereof and the other a series of longitudinal keys on the outer surface thereof, a plurality of annular disks between said elements, alternate disks being provided with teeth or projections on their outer and inner peripheries respectively to engage said keys whereby the disks are connected to rotate with said drums, one set of disks being composed principally of asbestos fibre held to shape by a suitable binder with the teeth integral with the bodies of the disks and the other set composed of metal, and means for bringing the disks into frictional engagement whereby one set will be driven by the other.

5. In a multiple disk clutch a pair of concentric relatively rotatable drums spaced from each other, the outer of which drums has a plurality of longitudinal keys on the inner surface thereof and the inner drum being provided with a plurality of longitudinal keys on the outer surface thereof, a plurality of annular disks between said elements, the alternate disks being provided with teeth on their outer and inner peripheries respectively to engage the keys on the drums whereby the disks are connected to rotate with the drums, one set of disks being composed of compressed fibre principally asbestos held together by a suitable binder with the teeth integral with the bodies of the disks and the other set composed of metal, and means for sliding one of said drums axially of the other drum to bring the disks into frictional engagement whereby one will be driven by the other, or to allow separation of said disks.

6. A friction disk for a multiple disk clutch composed of compressed fibre held together by a suitable binder, said disk being provided with driving teeth on the periphery thereof integral with the body of the disk.

7. A friction disk for a multiple disk clutch composed of compressed fibre principally asbestos held together by a suitable binder, said disk being provided with driving teeth on the periphery thereof integral with the body of the disk.

8. A friction disk for a multiple disk clutch comprising a flat annular ring composed of a compressed fibre held together by a suitable binder, said ring being provided on one of its peripheries with a series of driving teeth integral with the body of the ring.

9. A friction disk for a multiple disk clutch comprising a flat annular ring composed of a compressed fibre principally asbestos held together by a suitable binder, said ring being provided on its periphery with a plurality of driving teeth integral with the body of the ring.

10. A friction disk for a multiple disk clutch composed principally of asbestos fibre held together by a suitable binder, said disk being provided with driving teeth on a periphery thereof integral with the body of the disk.

In testimony whereof I affix my signature.

MORTON F. JUDD.